June 2, 1959        A. BAPTISTA        2,888,890
WATER CONTROL SYSTEM FOR PLANTING MACHINES
Filed July 26, 1957        2 Sheets-Sheet 1
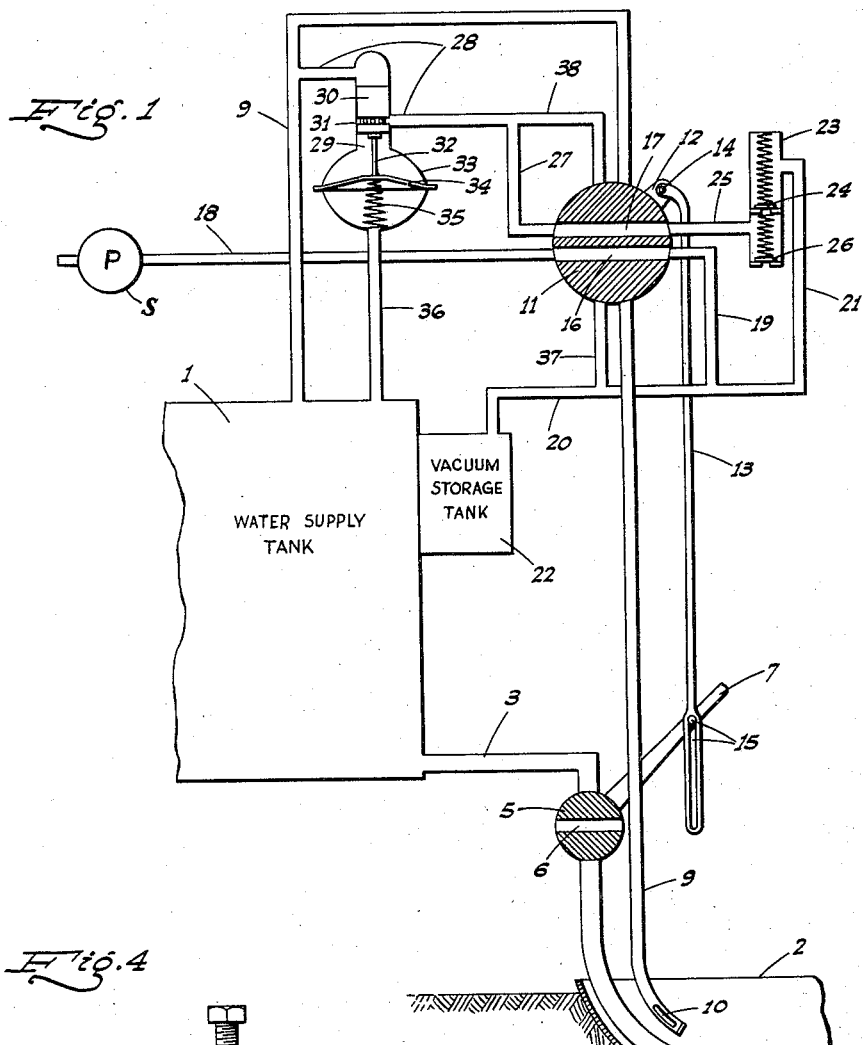
INVENTOR.
Albert Baptista
BY Webster & Webster
ATTYS.

June 2, 1959 A. BAPTISTA 2,888,890
WATER CONTROL SYSTEM FOR PLANTING MACHINES
Filed July 26, 1957 2 Sheets-Sheet 2
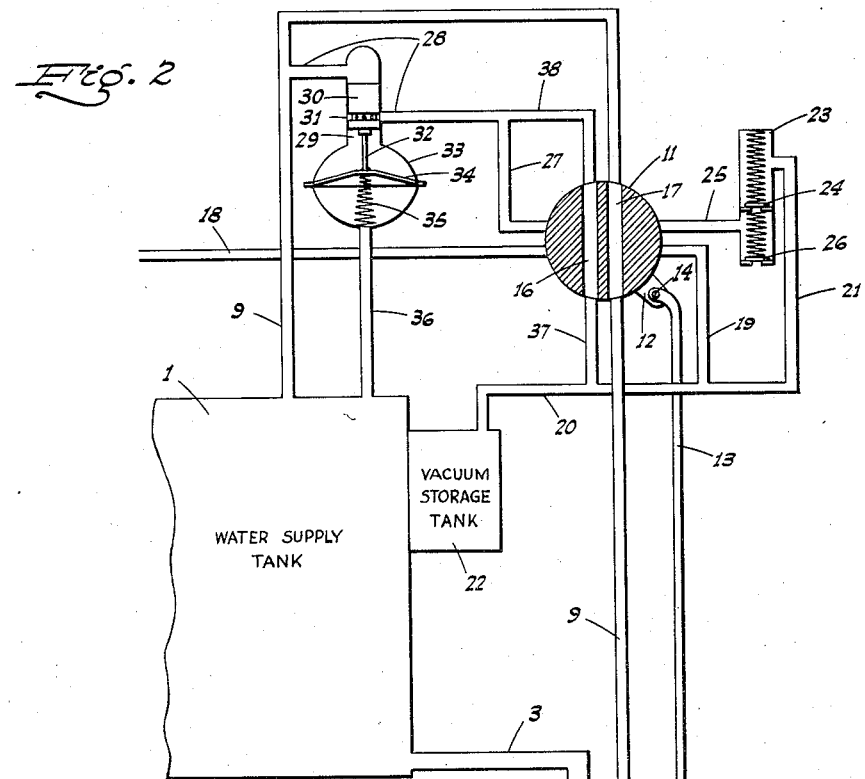
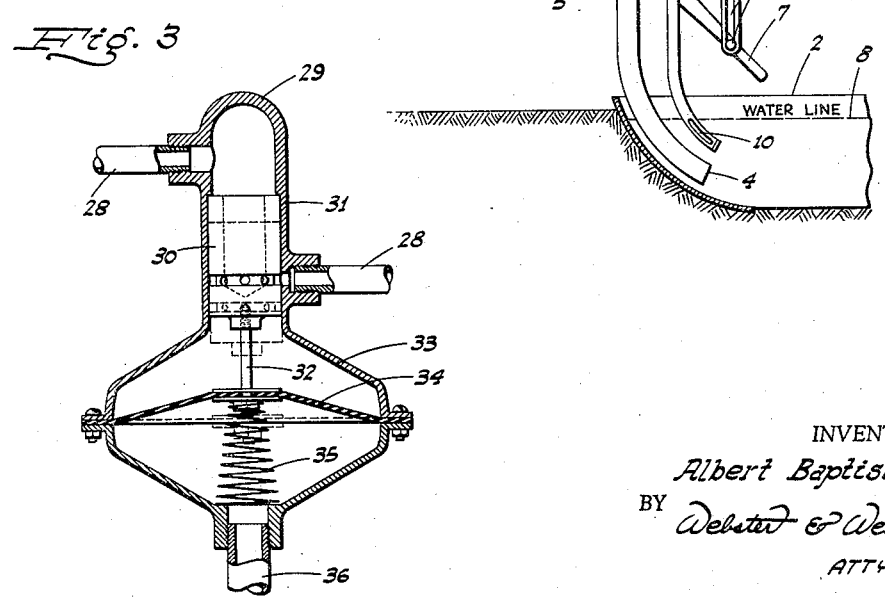
INVENTOR.
*Albert Baptista*
BY *Webster & Webster*
ATTYS.

United States Patent Office 2,888,890
Patented June 2, 1959

2,888,890

WATER CONTROL SYSTEM FOR PLANTING MACHINES

Albert Baptista, Livingston, Calif.

Application July 26, 1957, Serial No. 674,319

4 Claims. (Cl. 111—7)

The present invention is directed to, and it is a major object to provide, a novel system especially designed—but not limited—for feeding water from a supply tank into a planting machine shoe, and the furrow formed thereby, and to automatically maintain the water in such shoe and furrow at a substantially constant level while the gravity feed pipe from such tank remains open. The system thus avoids the necessity of close watch by an operator and the frequent manual opening and closing of a valve, in such feed pipe, for the purpose of maintaining the desired water level.

Another important object of this invention is to provide a water control system, as in the preceding paragraph, wherein the flow of water from the supply tank, and through the normally open feed pipe, is under regulation by a vacuum head in the tank, and the admission of air into such tank—in an amount and only at the times—necessary to permit sufficient water to gravitate through the feed pipe and into the planting machine shoe to maintain the substantially constant water level.

An additional object of the invention is to provide a water control system, as above, wherein such admission of air into the water supply tank is attained by novel means, which includes a breather pipe depending—at its intake end—into the planting machine shoe, and which intake end of the breather pipe is opened and closed, by fall and rise, respectively, of the water level in said shoe.

It is also an object of the invention to provide a water-control system, for the purpose described, which is relatively simple in structure, and designed for easy and convenient installation, either at the time of original manufacture of the planting machine, or subsequently as an attachment.

Still another object of the invention is to provide a practical and reliable water control mechanism for planting machines, and one which will be exceedingly effective for the purpose for which it is designed.

The above objects are accomplished by means of such structure and relative arrangement of parts as will fully appear by a perusal of the following specification and claims.

In the drawings:

Fig. 1 is a diagrammatic view of the water control system; the view showing the valves as initially positioned.

Fig. 2 is a similar view, but shows the valves as positioned for automatic operation of the water control system.

Fig. 3 is an enlarged sectional elevation of the spring-opened, diaphragm-controlled, valve unit.

Fig. 4 is an enlarged sectional elevation of the dual check valve unit.

Referring now more particularly to the drawings, and to the characters of reference marked thereon, the numeral 1 indicates the water supply tank of a planting machine which includes a furrow-opening shoe 2; there being a relatively large-diameter water feed pipe 3 which leads from the bottom of the water supply tank 1 to a discharge end 4 in the shoe 2 well below the top of the latter and the furrow formed thereby.

A two-way rotary valve 5 is interposed in the feed pipe 3 between tank 1 and shoe 2; such valve—whose passage is indicated at 6—being adapted to be opened and closed by means of a radial lever arm 7.

When such radial lever arm 7 is in an upwardly inclined position, as in Fig. 1, the valve 5 is closed, and when said lever arm 7 is in a downwardly inclined position, as in Fig. 2, said valve 5 is open. This particular positioning of the lever arm 7 is of importance in connection with the functioning of the system, as will hereinafter appear.

The water supply tank 1, furrow-opening shoe 2, feed pipe 3, and valve 5 are essentially elements of an existing type of planting machine, and which machine is not here otherwise shown. In the conventional planting machine the valve 5 is manually opened and closed by an operator; the operator manipulating such valve in order to maintain a predetermined or substantially constant water line or level 8 in the planting shoe 2 and the furrow formed thereby. It is the essential purpose of the present invention to provide a system which permits the valve 5 to remain open as the planting machine advances, yet regulates the flow through the feed pipe 3 to maintain the level 8 without manual attention.

Such water control system comprises—in combination with the planting machine elements hereinbefore described—the following:

A breather pipe 9 depends into the planting machine 2 and terminates therein below its upper edge; the lower end of the breather pipe 9 being closed, and immediately above such end—but wholly within the shoe 2—the pipe is slotted, as at 10, to provide an air intake opening; the upper end of said opening being slightly below the water level 8.

The breather pipe 9, above the planting machine 2, extends upwardly and is then directed to connection with the top of the water supply tank 1; such tank being of closed type, i.e. is not—when in use—open to atmosphere, except for the admission of air by the present system, as will hereinafter appear.

A dual-passage, four-way, rotary valve (in effect an eight-way valve) is indicated at 11; such valve being operated by a radial lever arm 12 which has an upwardly inclined position, as in Fig. 1, and a downwardly inclined position, as in Fig. 2; such positions corresponding generally to those of the lever arm 7 of valve 5.

A connecting rod 13 is pivoted at its upper end, as at 14, to the outer end of the lever arm 12, while at its lower end such rod is attached to the lever arm 7 by a lost-motion connection 15.

The dual passages of the valve 11 are indicated at 16 and 17, and in the initial position of said valve, as in Fig. 1, the passage 16 establishes communication between a pipe 18 and another pipe 19. The pipe 18, at the end opposite the valve 11, is connected to a suitable source of vacuum, which is preferably the suction manifold of the tractor to which the planting machine is coupled, but which may be a suction pump such as indicated at S in Fig. 1. The pipe 19, beyond 19, beyond the valve 11, is branched; the branches being indicated at 20 and 21.

The pipe branch 20 leads to a vacuum tank 22 suitably mounted on the machine, while the pipe branch 21 leads to connection with a dual check valve unit 23, shown in detail in Fig. 4. Such dual check valve unit 23 includes an adjustable, spring-pressed check valve 24 which opens in the direction of the pipe branch 21, or—in other words—toward the vacuum tank 22.

Beyond the check valve 24 said dual check valve unit 23 is connected to a pipe 25 which leads to the valve 11 and communicates with the passage 17 when said valve is positioned as in Fig. 1.

A second spring-pressed check valve 26 is included in the dual check valve unit 23, in position to provide a normally closed break to atmosphere in the line between the outlet from the check valve 23 and the adjacent end of pipe 25.

In the initial position of the valve 11, as in Fig. 1, the passage 17—previously described as communicating at one end with the pipe 25—communicates at the other end with one branch 27 of a pipe 28; the latter leading to communication with the breather pipe 9, but between the branch 27 and said breather pipe 9 having a valve 29 interposed therein.

The valve 29 is a normally spring-opened, diaphragm-controlled, unit, shown in detail in Fig. 3. Such valve unit 29 includes a sliding valve body 30 which works in a cylinder 31 between an open and a closed position; there being an axial rod 32 which extends from one end of the valve body 30 into a chamber 33 partitioned by a diaphragm 34. The diaphragm 34 is normally urged in a valve-opening direction by a compression spring 35 engaged between the diaphragm 34 and the bottom of the chamber 33; such chamber being in communication—at said bottom—with a pipe 36 which opens at its opposite end into the water supply tank 1 at the top of the latter.

The valve 11 is interposed in the breather pipe 9 intermediate its ends, and in a manner such that when said valve 11 is changed from the position of Fig. 1 to the position of Fig. 2, passage 17 of said valve 11 registers with—and becomes a communicative part of—said breather pipe. At the same time passage 16 registers, at its ends, with pipes 37 and 38; the pipe 37 connecting to pipe branch 20, while pipe 38 connects to pipe 28, and in effect becomes a branch of the latter.

When the passage 17 is in register with the breather pipe 9, and passage 16 is in register with the pipes 37 and 38, the valve is closed relative to pipes 18, 19, 25, and 27.

*Operation*

In the operation of the above described water control system, the valve 5 is initially closed; the valve 11 is in the position shown in Fig. 1; the valve unit 29 is open; and the check valves 24 and 26 of the valve unit 23 are closed.

Then, with pipe 18 connected to a source of vacuum, such vacuum—through passage 16 and pipes 19 and 20—first produces a vacuum in the tank 22, and when such vacuum reaches a predetermined point the pull exerted on the check valve unit 23 through the pipe branch 21 opens the check valve 24. When this occurs vacuum is established in pipe 25; passage 17; pipe branch 27; pipe 28 (through the open valve unit 29); breather pipe 9 between pipe 28 and tank 1; and finally in said tank.

In order to impose only a relatively light vacuum on tank 1 at the outset there is provided the check valve 26, and which check valve opens to atmosphere when the desired vacuum in the tank 1 is reached.

With the valves 5 and 11 in the position of Fig. 1, and as the planting machine starts to advance along a crop row, the operator swings the lever arm 7 from its "up" position downwardly sufficient to partially open the valve 5, but at which time—and by reason of the lost-motion connection 15—the valve 11 is turned out of register with the pipes with which it communicates, as in Fig. 1, but stops short of the pipes with which it registers in the position shown in Fig. 2.

With such setting, water from the tank 1 delivers through the feed pipe 3 into the planting machine shoe 2 and fills such shoe—and the furrow—up to the level 8, and which level 8 is above the slotted air intake opening 10. The relatively light vacuum which was initially imposed on the water tank 1 prevents surging during the above operation—of water as it delivers through the pipe 3; i.e., prevents the water from rushing into the shoe 2.

Next, the operator completes the "down" throw of the lever arm 7, which fully opens the valve 5 and turns valve 11 to its position shown in Fig. 2. When the valve 11 is so turned to its position shown in Fig. 2, the vacuum from tank 22 is imposed through pipe branch 20; pipe 37; passage 16; pipe 38; pipe 28—including valve unit 29—and breather pipe 9, on the water in tank 1. The vacuum head thus created in such tank is sufficient to prevent water from flowing out of said tank 1 through feed pipe 3, and the then full-open valve 5 therein. The system is now ready for automatic operation.

Thereafter, each time that the water level 8 drops an appreciable amount, and to an extent to expose the upper end of the air intake opening 10 to atmosphere, a certain amount of air is drawn into the breather pipe 9 and relieves the vacuum in tank 1 sufficient to permit water to flow out of the latter through pipe 3 and into the shoe 2. As soon as the water level 8 is re-established, and the air intake opening 10 is closed by the water, the flow from tank 1 stops—under the influence of the remaining vacuum in said tank—and the tendency to vacuum caused by the water which was discharged.

It will thus be recognized that with the system set as shown in Fig. 2, the water level 8 will be automatically maintained in the shoe 2 and the furrow formed thereby.

As the degree of vacuum which is available from the tank 22 is not unlimited, it is contemplated that at the end of each crop row the operator will repeat the above described manipulation of the valves, starting from the position shown in Fig. 1, and in which position the tank 22 is evacuated.

The purpose of the control of valve unit 29 by the diaphragm 34 is one of safety; i.e. if at any time the vacuum in the tank 1 exceeds a predetermined amount, such diaphragm is sucked downwardly, against the compression of spring 35; which shifts the valve body 30 in a like direction to close the valve unit 29. With the valve unit 29 so closed no additional vacuum can transfer from the vacuum tank 22 to the water tank 1. See the dotted line position of the diaphragm and valve in Fig. 3.

From the foregoing description it will be readily seen that there has been produced such a system as will substantially fulfill the objects of the invention, as set forth herein.

While this specification sets forth in detail the present and preferred construction of the system, still in practice such deviations from such detail may be resorted to as do not form a departure from the spirit of the invention, as defined by the appended claims.

Having thus described the invention, the following is claimed as new and useful, and upon which Letters Patent is desired:

1. A water control system for a planting machine having a closed water supply tank, a furrow opening shoe, a gravity feed pipe leading from the tank to the shoe, and a valve in the feed pipe fully open when the system is in operation; said system comprising, with a source of vacuum, a vacuum tank, a first conduit unit leading from said source to the vacuum tank, a second conduit unit formed in part with the first conduit connecting the vacuum and water supply tanks to establish a vacuum head in the water supply tank, a breather pipe leading from the shoe below said predetermined water level therein and connected to the second conduit unit operative to admit air to the water supply tank to partially release the vacuum therein, and to stop such admission of air, respectively; a valve unit included with and interposed in the first and second conduit units and the breather pipe to establish communication between the water supply and vacuum tanks while breaking communication between the vacuum tank and the source of vacuum when the feed pipe valve is open, and vice versa; the feed pipe valve being adapted to be first partially and then fully opened from a closed position, and motion transmitting means connecting the feed pipe valve and the valve unit so that said valve unit moves to said communication establishing position only when the feed pipe valve has been moved to a fully open position; the breather pipe being connected to the second conduit unit at a point between the valve unit and the water supply tank.

2. A system, as in claim 1, with a normally open valve interposed in the second conduit unit between the valve unit and the water supply tank, and means to close the valve by excess vacuum in said tank; the breather pipe being connected to said second conduit unit at a point beyond said normally open valve in the direction of the water supply tank.

3. A system, as in claim 1, with a third conduit unit connecting the first and second conduit units ahead of and beyond the valve unit, respectively, the valve unit being arranged to close the third conduit unit when the first and second conduit units are open and to open the third conduit unit when the first and second conduit units are closed by said valve unit, and a check valve interposed in the third conduit unit ahead of the valve unit and opening in the direction of the vacuum tank.

4. A system, as in claim 3, with another check valve, opening to atmosphere, connected to the third conduit unit and disposed between the first named check valve and the valve unit, there being spring means yieldably holding said other check valve closed.

References Cited in the file of this patent

UNITED STATES PATENTS

| | | |
|---|---|---|
| 1,705,845 | Woodman | Mar. 19, 1929 |
| 1,972,962 | Weber | Sept. 11, 1934 |
| 2,000,354 | Sherman | May 7, 1935 |
| 2,207,527 | Weber | July 9, 1940 |